UNITED STATES PATENT OFFICE.

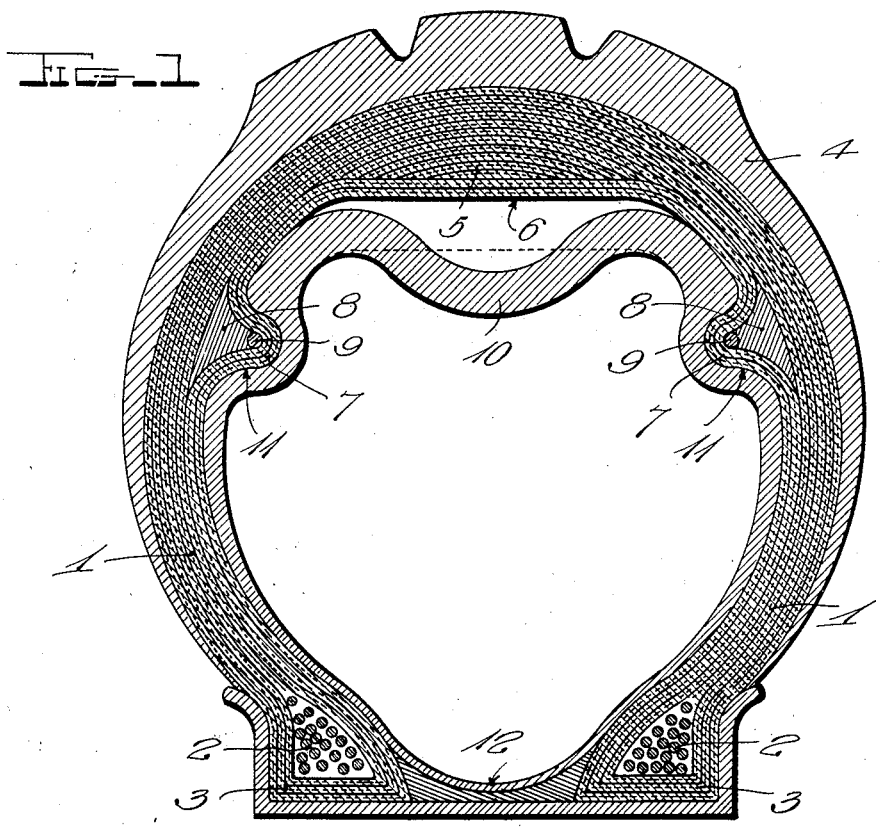
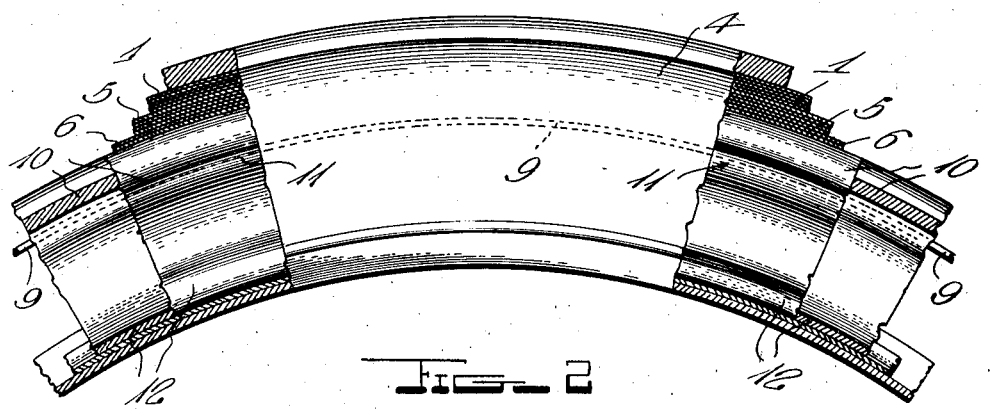

BENJAMIN C. SEATON, OF NASHVILLE, TENNESSEE.

PNEUMATIC TIRE.

1,374,957.  Specification of Letters Patent.  Patented Apr. 19, 1921.

Application filed February 5, 1920. Serial No. 356,427.

*To all whom it may concern:*

Be it known that I, BENJAMIN C. SEATON, a citizen of the United States, residing at Nashville, in the county of Davidson and State of Tennessee, have invented certain new and useful Improvements in Pneumatic Tires; and I do declare the following to be a full, clear, and exact description of the invention, such as will enable others skilled in the art to which it appertains to make and use the same.

This invention relates to pneumatic tires.

One object of the invention is to provide a pneumatic tire having a pneumatic inner tube provided with a puncture closing tread portion.

Another object of the invention is to provide a pneumatic tire having a pneumatic inner tube provided with a puncture closing tread portion located between fixed points and limited in extent by coöperating means carried by the inner tube and outer casing and being compressible by the air pressure contained in the tube when the same is inflated.

A further object of the invention is to provide a pneumatic tire, the pneumatic inner tube of which has a puncture closing tread portion limited in extent by fixed points and compressible by the air pressure contained in the tube when inflated, and having its rim side normal and not being subjected to compression or expansion.

A still further object of the invention is to provide a pneumatic tire having a pneumatic inner tube provided with a compressible puncture closing tread portion, the outer casing and inner tube being provided with means for preventing shifting of the inner tube in the outer casing, this means also serving to prevent the inner tube from being placed in a wrong position in the outer casing.

An additional object of the invention is to generally improve upon devices of this class by the provision of a comparatively simple, strong, durable and inexpensive construction, one which will be efficient and reliable in operation, and well adapted to the purpose for which it is designed.

With these and other objects in view, the invention consists of the novel features of construction, and the combination and arrangement of parts as will be hereinafter fully described and claimed.

In the accompanying drawings in which similar reference characters designate like parts throughout the several views:

Figure 1 is a transverse sectional view of a tire constructed in accordance with this invention, and Fig. 2 is a longitudinal sectional view, partly in elevation, of a portion of the tire.

The invention contemplates using an outer casing made up of a carcass 1 consisting of a number of layers of the fabric generally used in the manufacture of outer casings and having the usual rim construction. Secured in the usual manner to the outer side of the carcass 1 is a soft rubber or other suitable covering 4. Ordinarily outer casings are made with a number of narrow breaker strips on the outer tread portion of the carcass, but this has not been done in this case. Instead, narrow breaker strips 5 are disposed on the inner side of the tread portion of the carcass so as to make this inner side flat as indicated at 6. Formed inside the casing on opposite sides thereof adjacent the tread portion 6 are annular ribs 7, this construction being effected by forming loops in the innermost layers of the carcass 1 and interposing cushion bodies 8 in the open portions of the loops. If desired, cords 9 or other suitable means may be placed in ribs 7 to reinforce the same.

Disposed within the outer casing is a pneumatic inner tube provided on its outside at its two opposite sides adjacent its tread portion 10 with annular grooves 11 shaped so as to receive the ribs 7. The tread portion 10 of the tube is of greater thickness than the rim portion 12 thereof and is greater in width on a line following its outer surface than the width of the tread portion 6 of the outer casing so that when the tube is in deflated condition, the tread portion 10 thereof will bow inwardly away from the flat tread portion 6 of the casing as indicated by the full lines of Fig. 1. When, however, the tube is inflated the pressure of the air acting upon the tread portion 10 thereof will cause the latter to be pressed tightly against the flat portion 6 of the casing as shown by the dotted line in Fig. 1, and since the tread portion 10 is limited in extent by the ribs 7 fitting in the grooves 10, the tread portion 10 will be decreased in width and compressed. In this state of compression the particles which make up the tread portion 10 of the tube are closer together than they are under normal uncompressed condition, and should a nail or the like pierce the outer casing and the tread portion 10 and then be taken away, the aperture formed thereby will immediately and automatically close.

Attention may here be directed to the fact that the tread portion 10 is transversely compressed to an extent sufficient to more than counteract the circumferential stretch caused by inflation. This cannot be done without providing means for restricting the compression to the tread portion. Without such means, the circumferential stretch of the tread portion opens the pores of the rubber to an extent which will not be counteracted by the transverse compression and hence self-sealing of punctures will not be perfectly effected.

The ribs 7 fitting in grooves 11 hold the inner tube in position in the outer casing and prevent the state of compression in the tread portion 10 from passing beyond said tread portion when the tube is inflated. Except for its inwardly bowed portion 10, the tube contacts with the casing before inflation so that there will be no stretching and opening of the pores when inflation takes place.

It has been found that the above described construction is best suited for carrying out the objects of the invention, but within the scope of the appended claims, various changes in form, proportion, and in the minor details of construction may well be made.

I claim as my invention:

1. A device of the class described comprising an outer casing, a pneumatic inner tube inside said casing, annular shoulders on said casing and said tube at opposite sides adjacent the tread portions thereof, the shoulders of the tube abutting the shoulders of said casing, the tread portion of said tube being of greater width than the distance between the shoulders on said casing on the line of the inner surface of the tread portion of the latter, whereby the tread portion of said tube bows inwardly away from the tread portion of said casing and upon inflation of said tube is pressed against the tread portion of said casing to compress the material of the tread portion of said tube.

2. A device of the class described comprising an outer casing having the inner surface of its tread portion flat, a pneumatic inner tube, annular shoulders on said casing and said tube at opposite sides adjacent the tread portions thereof, the shoulders of the tube abutting the shoulders of the casing, the tread portion of said tube being of greater width than the distance between the shoulders on said casing on the line of the inner surface of the tread portion of the latter, whereby the tread portion of said tube bows inwardly away from the flat tread portion of said casing and upon inflation is flattened against the flat tread portion of said casing to compress the material of the tread portion of said tube.

3. A device of the class described comprising an outer casing having the inner surface of its tread portion flat, annular ribs inside said casing at opposite sides adjacent the tread portion thereof, an inner tube inside said casing having a thickened tread portion and provided at opposite sides adjacent its tread portion with annular grooves receiving said ribs, the tread portion of said tube being of greater width than the distance between said ribs on the line of the inner surface of the tread portion of said casing, whereby the tread portion of said tube bows inwardly away from the flat tread portion of said casing and upon inflation is flattened against the flat tread portion of said casing to compress the material of the tread portion of said tube.

4. A device of the class described comprising an outer casing, a pneumatic inner tube within said casing and having a compressible tread portion, and interengaging means at opposite sides of said casing and said tube adjacent the tread portion thereof for augmenting compression of the tread portion of said tube under the pressure of air in said tube when the latter is inflated, the remaining portion of said tube being of a size to fit the casing before inflation.

5. In combination, a tire casing, a tube therein having a thickened tread portion normally bowed inwardly from the tread of said casing but movable outwardly against said casing under inflation of the tube, whereby to transversely compress said thickened tread portion, said casing being constructed to hold said tread portion of the tube against sufficient outward movement to impair the effectiveness of its compression, and means for confining the compression to the tread portion of the tube, thereby insuring sufficient transverse compression to counteract the circumferential stretch caused by inflation.

6. An inner tube having its tread portion thickened throughout its width and circumference and provided with continuous external shoulders bordering said tread portion for contact with ribs in a casing, said tread portion of the tube being inwardly bowed and having an inherent tendency to retain said bowed formation until inflated.

7. A structure as specified in claim 6, all portions of said tube except its inwardly bowed tread portion being shaped to fit the tire casing before inflation.

In testimony whereof I have hereunto set my hand.

BENJAMIN C. SEATON.